(12) United States Patent
Wakabayashi et al.

(10) Patent No.: US 12,388,150 B2
(45) Date of Patent: Aug. 12, 2025

(54) POWER SOURCE DEVICE

(71) Applicant: SANYO Electric Co., Ltd., Osaka (JP)

(72) Inventors: Takeaki Wakabayashi, Hyogo (JP); Kensaku Takeda, Tokushima (JP)

(73) Assignee: PANASONIC ENERGY CO., LTD., Osaka (JP)

( * ) Notice: Subject to any disclaimer, the term of this patent is extended or adjusted under 35 U.S.C. 154(b) by 875 days.

(21) Appl. No.: 17/439,237

(22) PCT Filed: Feb. 21, 2020

(86) PCT No.: PCT/JP2020/007027
§ 371 (c)(1),
(2) Date: Sep. 14, 2021

(87) PCT Pub. No.: WO2020/195423
PCT Pub. Date: Oct. 1, 2020

(65) Prior Publication Data
US 2022/0158293 A1 May 19, 2022

(30) Foreign Application Priority Data
Mar. 27, 2019 (JP) .................. 2019-060102

(51) Int. Cl.
H01M 50/30 (2021.01)
H01M 10/615 (2014.01)
(Continued)

(52) U.S. Cl.
CPC ......... *H01M 50/30* (2021.01); *H01M 10/615* (2015.04); *H01M 50/213* (2021.01);
(Continued)

(58) Field of Classification Search
None
See application file for complete search history.

(56) References Cited

U.S. PATENT DOCUMENTS 9,553,289 B2 * 1/2017 Lee ................. H01M 50/30
9,985,259 B2 * 5/2018 Aoki ............... H01M 50/291
(Continued)

FOREIGN PATENT DOCUMENTS

EP 3157093 A1 4/2017
JP 2008-117765 5/2008
(Continued)

OTHER PUBLICATIONS

International Search Report of PCT application No. PCT/JP2020/007027 dated May 26, 2020.
(Continued)

*Primary Examiner* — Scott J. Chmielecki
(74) *Attorney, Agent, or Firm* — WHDA, LLP

(57) ABSTRACT

A power source device includes: a plurality of batteries each including a discharge valve that opens when an internal pressure becomes higher than a set pressure and jets emission gas; outer case that houses these batteries and is composed by providing discharge opening that discharges, to an outside, the emission gas from the discharge valve; and heat-resistant plate that is a part of outer case and is composed by being disposed in a facing attitude in an inside of exhaust surface (25) composed by providing discharge opening, wherein heat-resistant plate is: provided with, along an outer peripheral edge, energy attenuation gap between the heat-resistant plate itself and an inner surface of the outer case; provided with planar heat radiation gap between the heat-resistant plate itself and an inner surface of the exhaust surface; and composed to cause the emission gas jetted from the discharge valves to pass through energy attenuation gap and heat radiation gap, and to be discharged from discharge opening to an outside.

12 Claims, 5 Drawing Sheets

(51) Int. Cl.
   *H01M 50/213* (2021.01)
   *H01M 50/227* (2021.01)
   *H01M 50/278* (2021.01)
   *H01M 50/284* (2021.01)
   *H01M 50/578* (2021.01)

(52) U.S. Cl.
   CPC ........ *H01M 50/578* (2021.01); *H01M 50/227* (2021.01); *H01M 50/278* (2021.01); *H01M 50/284* (2021.01); *H01M 2200/20* (2013.01)

(56) References Cited

U.S. PATENT DOCUMENTS

| | | | | |
|---|---|---|---|---|
| 10,854,866 | B2 * | 12/2020 | Demont | H01M 50/394 |
| 2008/0171259 | A1 * | 7/2008 | Kanai | H01G 11/80 |
| | | | | 429/163 |
| 2010/0104928 | A1 | 4/2010 | Nishino et al. | |
| 2010/0255359 | A1 * | 10/2010 | Hirakawa | H01M 50/30 |
| | | | | 429/120 |
| 2012/0235481 | A1 * | 9/2012 | Nakashima | H01M 10/6563 |
| | | | | 307/26 |
| 2016/0204404 | A1 * | 7/2016 | Shimizu | H01M 50/342 |
| | | | | 429/82 |
| 2016/0285142 | A1 * | 9/2016 | Kimura | H01M 10/657 |
| 2017/0036604 | A1 * | 2/2017 | Campbell | B60R 3/002 |
| 2017/0096079 | A1 * | 4/2017 | Yokote | B60K 1/00 |
| 2018/0269448 | A1 | 9/2018 | Shimizu et al. | |
| 2018/0363992 | A1 * | 12/2018 | Hirata | F28D 7/16 |
| 2024/0429532 | A1 * | 12/2024 | Dong | H01M 50/224 |

FOREIGN PATENT DOCUMENTS

| | | |
|---|---|---|
| JP | 2015-135763 A | 7/2015 |
| WO | 2015/064096 | 5/2015 |
| WO | 2015/190302 A1 | 12/2015 |

OTHER PUBLICATIONS

Extended (Supplementary) European Search Report dated Apr. 20, 2022, issued in counterpart EP Application No. 20776867.2. (9 pages).

* cited by examiner

POWER SOURCE DEVICE

CROSS-REFERENCE TO RELATED APPLICATIONS

This application is a U.S. national stage application of the PCT International Application No. PCT/JP2020/007027 filed on Feb. 21, 2020, which claims the benefit of foreign priority of Japanese patent application No. 2019-060102 filed on Mar. 27, 2019, the contents all of which are incorporated herein by reference.

TECHNICAL FIELD

The present invention relates to a power source device that builds therein a battery having a discharge valve.

BACKGROUND ART

A secondary battery provided with a discharge valve that opens when an internal pressure becomes higher than a set pressure can improve safety by opening the discharge valve in a state where the internal pressure rises abnormally. For a power source device that builds this battery in an outer case, it is important to safely discharge emission gas, which is discharged from the discharge valve, to the outside of the outer case. In particular, in a secondary battery that uses a nonaqueous electrolytic solution, high-temperature gas as a result of vaporization of an electrolytic solution is jetted from the discharge valve to the outside of a battery case. Moreover, at the same time, there occurs such a harmful effect that sparks are emitted to the outside of the outer case. Thus, there occurs such a harmful effect that fire is generated on the outside of the outer case in such a manner that the high-temperature gas emitted to the outside of the outer case stays on the outside of the outer case, and that the sparks are thus emitted to the outside of the outer case. A power source device has been developed, in which a gas cooler and a spark trap are provided in an exhaust duct that discharges, to the outside of an outer case, emission gas jetted from a discharge valve of a battery (see PTL 1).

CITATION LIST

Patent Literature

PTL 1: Unexamined Japanese Patent Publication No. 2008-117765

SUMMARY OF THE INVENTION

Technical Problem

The power source device of PTL 1 provides an exhaust duct with connecting pipe portions, a main pipe portion, a gas cooler, a spark trap, and an exhaust port. The connecting pipe portions connect discharge valves of batteries to the main pipe portion, and the connecting pipe portions come into close contact with opening portions of the discharge valves of the batteries by a highly heat resistant adhesive such that the emission gas from the batteries can flow thereinto without leak. The main pipe portion is coupled to the gas cooler, and flows, into the gas cooler, the emission gas flown in from the connecting pipe portions. In order to cool the flown-in emission gas, the gas cooler provides an inner wall surface thereof with a heat absorber such as a highly heat conductive material and a high specific heat material. The spark trap is a portion that is coupled to the gas cooler with a communication pipe interposed therebetween and collects sparks of the emission gas that flows in from the gas degradation portion. The spark trap provides an inner wall surface with a porous ceramic plate, a gel sheet, a copper mesh, an aluminum mesh, a SUS mesh, a cement plate, or a plasterboard. The exhaust duct with such a structure flows the emission gas of the battery from the connecting pipe portions into the main pipe portion, passes the same through the main pipe portion, then passes the same through the gas cooler, and thereafter, discharges the same from the spark trap to the outside.

The above-described power source device has drawbacks that the structure of the discharge duct provided in order to prevent the sparks is extremely complicated, that both of component cost and manufacturing cost are high, and further, that a space is increased to make it difficult to downsize the whole.

The present invention has been developed in order to solve the above-described conventional drawbacks. It is an object of the present invention to provide a power source device that adopts an extremely simple structure and can be subjected to low-cost mass production while achieving high safety.

A power source device according to a certain aspect of the present invention includes: a plurality of batteries 1 each including a discharge valve that opens when an internal pressure becomes higher than a set pressure and jets emission gas; outer case 2 that houses these batteries 1 and is composed by providing discharge opening 26 that discharges, to an outside, the emission gas from the discharge valve; and heat-resistant plate 5 that is a part of outer case 2 and is composed by being disposed in a facing attitude in an inside of exhaust surface 25 composed by providing discharge opening 26, wherein heat-resistant plate 5 is: provided with, along an outer peripheral edge, an energy attenuation gap 6 between the heat-resistant plate itself and an inner surface of the outer case; provided with planar heat radiation gap 7 between the heat-resistant plate itself and an inner surface of the exhaust surface; and composed to cause the emission gas jetted from the discharge valves to pass through energy attenuation gap 6 and heat radiation gap 7, and to be discharged from discharge opening 26 to an outside.

The above-described power source device has a feature that an extremely simple structure is adopted and low-cost mass production can be achieved while achieving high safety.

DESCRIPTION OF EMBODIMENTS

Figure 1:
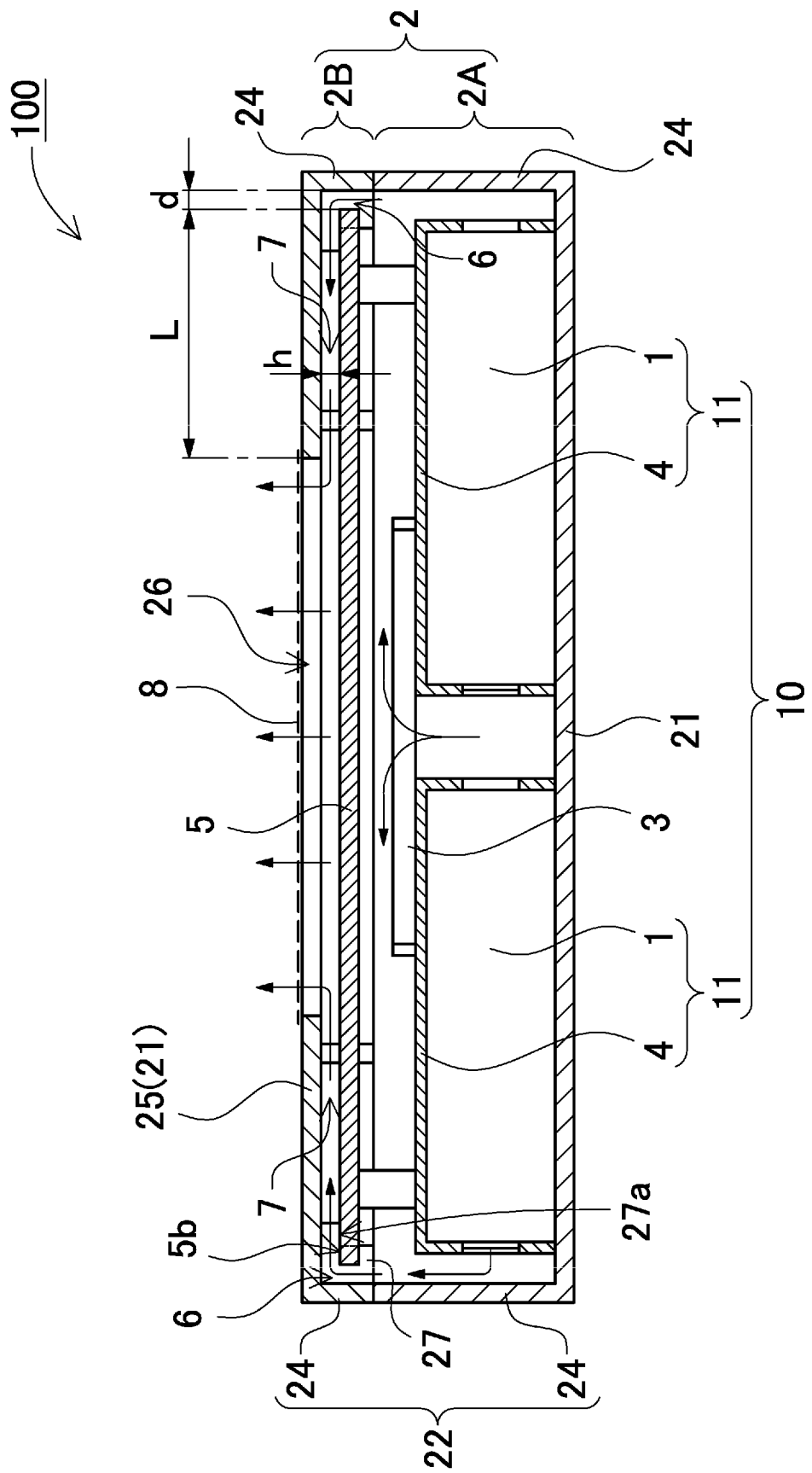
FIG. 1 is a schematic vertical longitudinal sectional view illustrating an internal structure of a power source device according to one exemplary embodiment of the present invention.

A detailed description will be given below of the present invention with reference to the drawings. In the following description, terms (for example, "top", "bottom", and other terms including those terms) indicating specific directions or positions are used as necessary; however, the use of those terms is for facilitating the understanding of the invention with reference to the drawings, and the technical scope of the present invention is not limited by the meanings of the terms. Moreover, portions having the same reference numerals, which appear in a plurality of drawings, indicate the same or equivalent portions or members.

Furthermore, the exemplary embodiments described below illustrate specific examples of the technical idea of the present invention, and do not limit the present invention to the following. Further, dimensions, materials, shapes, relative arrangements and the like of components described below are not intended to limit the scope of the present invention only thereto unless specifically stated, and are intended to be merely exemplified. Moreover, contents described in one exemplary embodiment and one example are also applicable to other exemplary embodiments and examples. Furthermore, sizes, positional relationships and the like of members illustrated in the drawings may sometimes be exaggerated in order to clarify the explanation.

A power source device according to a first invention of the present invention includes: a plurality of batteries each including a discharge valve that opens when an internal pressure becomes higher than a set pressure and jets emission gas; an outer case that houses the plurality of batteries and is composed by providing a discharge opening that discharges, to an outside, the emission gas from the discharge valve; and a heat-resistant plate that is a part of the outer case and is composed by being disposed in a facing attitude in an inside of an exhaust surface composed by providing the discharge opening, wherein the heat-resistant plate is: provided with, along an outer peripheral edge, an energy attenuation gap between the heat-resistant plate itself and an inner surface of the outer case; provided with a planar heat radiation gap between the heat-resistant plate itself and an inner surface of the exhaust surface; and configured to cause the emission gas jetted from the discharge valves to pass through the energy attenuation gap and the heat radiation gap, and to be discharged from the discharge opening to an outside.

The above-described power source device has features of adopting an extremely simple structure, reducing both of the component cost and the manufacturing cost, and being able to be subjected to low-cost mass production, and further, lowering temperature of high-temperature emission gas to be discharged from the discharge valve, suppressing flame from being emitted to the outside of the outer case, and being able to achieve high safety. The reason for the above is as follows. The above-described power source device disposes the heat-resistant plate while causing the heat-resistant plate to face the inside of the exhaust surface of the outer case provided with the discharge opening that discharges, to the outside, the emission gas from the battery, provides the energy attenuation gap between the outer peripheral edge and the inner surface of the outer case on the outer peripheral edge, and further, provides the planar heat radiation gap between the heat-resistant plate and the inner surface of the exhaust surface of the outer case. Then, the power source device causes the emission gas jetted from the discharge valve to pass through the energy attenuation gap provided between the outer periphery of the heat-resistant plate and the outer case, then causes the emission gas to pass through the heat radiation gap provided between the heat-resistant plate and the exhaust surface, and discharges the emission gas to the outside from the discharge opening of the exhaust surface.

The above-described power source device causes the high-temperature/high-pressure emission gas, which is jetted with force from the discharge valve of the battery, to pass through the narrow energy attenuation gap provided on the outer periphery of the heat-resistant plate, and absorbs energy of the emission gas. The energy attenuation gap is not a gap provided to penetrate the heat-resistant plate, but is a gap provided between the heat-resistant plate and the outer case. The emission gas loses energy thereof by passing through the narrow gap between the outer peripheral edge of the heat-resistant plate and the inner surface of the outer case, and at the time of this passage, radiates heat to the heat-resistant plate and the outer case. The emission gas that passes through the energy attenuation gap loses kinetic energy thereof by passing through the narrow gap, and further, loses thermal energy thereof by heating the heat-resistant plate and the outer case.

The emission gas can attenuate the energy by being transmitted through holes provided in the heat-resistant plate. However, the emission gas that passes through the through holes radiates heat only to the heat-resistant plate without radiating heat to the outer case. Accordingly, the thermal energy to be radiated to the heat-resistant plate increases, and this thermal energy damages the heat-resistant plate. Therefore, for example, when a heat-resistant plate made of polycarbonate is provided with a large number of through holes, and the emission gas is caused to pass therethrough, the heat-resistant plate is molten in just few seconds to increase the through holes in size, and it becomes impossible to attenuate the energy of the emission gas energy.

Between the heat-resistant plate and the outer case, the above-described power source device is provided with the energy attenuation gap, through which the high-temperature/high-pressure emission gas is caused to pass. The emission gas that passes here loses the thermal energy by radiating heat not only to the heat-resistant plate but also to both of the heat-resistant plate and the outer case. The thermal energy of the emission gas is radiated not only to the heat-resistant plate but also to the outer case. Accordingly, a thermal damage of the heat-resistant plate due to the emission gas is prevented, and the energy of the emission gas can be attenuated for a long time. The emission gas that has the attenuated energy by passing through the energy attenuation gap further flows into the planar heat radiation gap, and in the heat radiation gap, flows along the inner surface of the exhaust surface, and is discharged to the outside from the discharge opening. The emission gas that flows through the planar heat radiation gap flows while coming into contact by a wide area with the exhaust surface, and efficiently conducts the thermal energy to the outer case and radiates heat thereto. Moreover, due to a pressure loss caused when the emission gas passes through the narrow heat radiation gap, the emission gas also attenuates the kinetic energy, and is discharged from the discharge opening. Hence, the emission gas that is cooled by flowing through the heat radiation gap and conducting heat to the outer case, and further, also attenuates the kinetic energy in the heat radiation gap is discharged to the outside from the discharge opening. As described above, while adopting an extremely simple structure in which the energy attenuation gap and the heat radiation gap are provided in the inside of the exhaust surface to dispose the heat-resistant plate therein, the power source device efficiently attenuates the energy of the emission gas to be discharged to the outside of the outer case, and achieves the feature of being able to effectively prevent the fire generation on the outside of the case.

In a power source device of a second invention of the present invention, the energy attenuation gap is formed into a slit composed by being provided between an inner surface of the outer case and the outer peripheral edge of the heat-resistant plate.

The above-described power source device further has features that a simple structure is adopted, the energy attenuation gap can be provided on the outer peripheral edge of the heat-resistant plate, and in addition, the emission gas is caused to pass through this slit-shaped energy attenuation gap, and the kinetic energy and thermal energy of the emission gas can be efficiently attenuated.

In a power source device of a third invention of the present invention, a gap (d) of the slit that is the energy attenuation gap is set to less than or equal to 3 mm.

The above-described power source device narrows the energy attenuation gap to less than or equal to 3 mm, and accordingly, can efficiently attenuate the kinetic energy by increasing the pressure loss of the emission gas that passes here. Moreover, the power source device flows the emission gas through the narrow gap at high speed, efficiently emits the thermal energy to the heat-resistant plate and the outer case, and can also efficiently attenuate the thermal energy. The power source device has such features as described above.

In a power source device of a fourth invention of the present invention, the energy attenuation gap is provided on the entirety of the outer peripheral edge of the heat-resistant plate, and the discharge opening is provided in a central region of the exhaust surface.

The above-described power source device can provide the energy attenuation gap on the entire periphery of the heat-resistant plate, and can lengthen the same. Accordingly, while narrowing the gap and increasing the pressure loss, a large amount of the emission gas can be caused to rapidly pass therethrough. The narrow energy attenuation gap can diffuse the high-temperature/high-pressure emission gas jetted from a discharge valve of a specific battery, that is, from a specific position, and can cause the emission gas to pass therethrough. Therefore, the emission gas does not pass through the energy attenuation gap while being forcibly concentrated. The emission gas passes through the equalized energy attenuation gap, and can prevent a forcible thermal damage of the heat-resistant plate. Moreover, the discharge opening is disposed on the center portion of the exhaust surface. Accordingly, an interval (L) between the discharge opening and the energy attenuation gap provided on the entire periphery of the heat-resistant plate is equalized, and by the thermal energy of the emission gas that has flown into the heat radiation gap, heat can be efficiently radiated to the exhaust surface, and the discharge can be performed.

In a power source device of a fifth invention of the present invention, the energy attenuation gap is provided on a part of the outer peripheral edge of the heat-resistant plate, and the discharge opening is opened while being unevenly distributed opposite to the energy attenuation gap with respect to a central region of the exhaust surface.

The above-described power source device can lengthen the interval (L) from the energy attenuation gap to the discharge opening. Accordingly, the power source device can flow the emission gas, which has flown into the heat radiation gap from the energy attenuation gap, for a long time along the exhaust surface, and can discharge the emission gas from the discharge opening. Therefore, the power source device has a feature of being able to efficiently radiate heat of the emission gas, which flows through the heat radiation gap, to the exhaust surface, and discharge the emission gas.

In a power source device of a sixth invention of the present invention, the heat-resistant plate is provided with plural lines of coupling slits composed by being coupled to the energy attenuation gap in an attitude of intersecting the energy attenuation gap.

The above-described power source device is provided with the coupling slits of the heat-resistant plate in addition to the energy attenuation gap on the outer peripheral surface of the heat-resistant plate. Accordingly, the power source device can cause the emission gas to pass through both of the energy attenuation gap and the coupling slits, and can attenuate the energy.

In a power source device of a seventh invention of the present invention, an interval (h) between the heat-resistant plate and the exhaust surface is set to less than or equal to 3 mm, and the heat radiation gap is provided.

In the above-described power source device, the interval (h) of the heat radiation gap is set as narrow as less than or equal to 3 mm. Accordingly, the thermal energy of the emission gas that flows here can be efficiently radiated to the heat-resistant plate and the exhaust surface, and the emission gas can be discharged.

In a power source device of an eighth invention of the present invention, the heat-resistant plate is formed as a laminated body of heat-resistant plate plastics or a metal plate, or of plastics and a metal plate.

In a power source device of a ninth invention of the present invention, the outer case has a square shape, and the exhaust surface is formed as a surface plate portion with a maximum area.

The above-described power source device has a large exhaust surface, and accordingly, can increase an area of the heat-resistant plate disposed to face the same, can lengthen the energy attenuation gap by the large heat-resistant plate, and can increase an area of the heat radiation gap. Therefore, the energy of the emission gas can be efficiently attenuated by the energy attenuation gap, and the heat thereof can be efficiently radiated by the heat radiation gap, and the emission gas can be efficiently discharged.

In a power source device of a tenth invention of the present invention, the battery is a cylindrical battery, and a plurality of the cylindrical batteries are arranged in a plane parallel to the surface plate portion in an attitude parallel to one another.

The above-described power source device arranges the plurality of cylindrical batteries in the outer case, can increase the area of the exhaust surface, can enlarge the heat-resistant plate by the exhaust surface with a large area, can lengthen the energy attenuation gap by the large heat-resistant plate to efficiently attenuate the energy, and further, can efficiently radiate the heat of the emission gas by the heat radiation gap with a large area. Hence, the power source device that builds in the cylindrical batteries has a feature of being able to enhance safety.

In a power source device of an eleventh invention of the present invention, support ribs which protrude to the inner surface of the outer case and support the heat-resistant plate are provided by being molded integrally therewith, the heat-resistant plate is coupled to the support ribs, and the energy attenuation gap is provided along the outer peripheral edge of the heat-resistant plate.

The above-described power source device flows the emission gas, which passes through the energy attenuation gap, on the surfaces of the support ribs while arranging the heat-resistant plate at a fixed position by the support ribs, and can thereby efficiently radiate the thermal energy of the emission gas to the outer case through the support ribs. The power source device has such a feature. This is because the support ribs arranged to protrude to the inner surface of the outer case can increase a contact area with the emission gas.

In a power source device of a twelfth invention of the present invention, the support ribs include step parts which couple the heat-resistant plate thereto and dispose the heat-resistant plate at a fixed position.

The above-described power source device further increases the contact area with the emission gas by the support ribs including the step parts, efficiently radiates the thermal energy of the emission gas to the outer case more efficiently, and can thereby lower the temperature. The power source device has such a feature.

First Exemplary Embodiment

Power source device 100 illustrated in FIGS. 1 to 4 includes: a plurality of chargeable batteries 1; battery holder 4 that arranges batteries 1 at fixed positions; outer case 2 that arranges battery holder 4 in an inside thereof; heat-resistant plate 5 disposed in this outer case 2; and circuit board 3 that mounts thereon electronic components such as a protection circuit of battery 1.

(Battery 1)

Batteries 1 are cylindrical batteries. However, the power source device of the present invention does not specify the batteries to the cylindrical batteries. This is because chargeable rectangular batteries and the like can be used for batteries 1. Each of the cylindrical batteries houses electrodes and an electrolytic solution in a cylindrical metal case. The metal case adopts a sealed structure in which a sealing plate is hermetically fixed to an opening portion of a package can with a closed bottom. The package can is fabricated by pressing a metal plate. The sealing plate is caulked and hermetically fixed to a peripheral edge of the opening portion of the package can with a packing made of an insulating material interposed therebetween. Each of the rectangular batteries is provided with insulated positive and negative electrode terminals on the sealing plate that closes the opening portion of the metal case.

Although not illustrated, each of batteries 1 is provided with a discharge valve in the sealing plate in order to prevent the metal case from being broken due to an abnormal increase of an internal pressure thereof. The discharge valve provides the sealing plate with an opening portion that discharges internal gas in an open state. However, each of the batteries can also provide a bottom portion of the package can with the discharge valve and the opening portion thereof. The discharge valve opens when the internal pressure rises more than a set pressure, for example, 1.5 MPa, and prevents such a breakage of the metal case due to the increase of the internal pressure. The discharge valve opens in an abnormal state. Hence, the temperature of each of batteries 1 is also extremely high in a state where the discharge valve opens. Therefore, emission gas discharged from the opening discharge valve has an abnormally high temperature since the gas and the electrolytic solution (jetted matter) are mixed. In particular, in a nonaqueous electrolytic secondary battery using lithium ion batteries and the like as batteries 1, emission gas thereof reaches an abnormally high temperature of 400° C. or more. Furthermore, each of the lithium ion batteries is filled with a nonaqueous electrolytic solution, and accordingly, when this is discharged to the outside of the case at high temperature, then in some cases, this comes into contact with air and catches fire, and reaches a more abnormally high temperature. Not only in the lithium ion battery but also other chargeable batteries, the emission gas jetted from the opening discharge valve reaches high temperature, and accordingly, attenuation of energy of the emission gas and exhaust thereof to the outside of the case are important since safety is enhanced.

(Outer Case 2)

Figure 2:
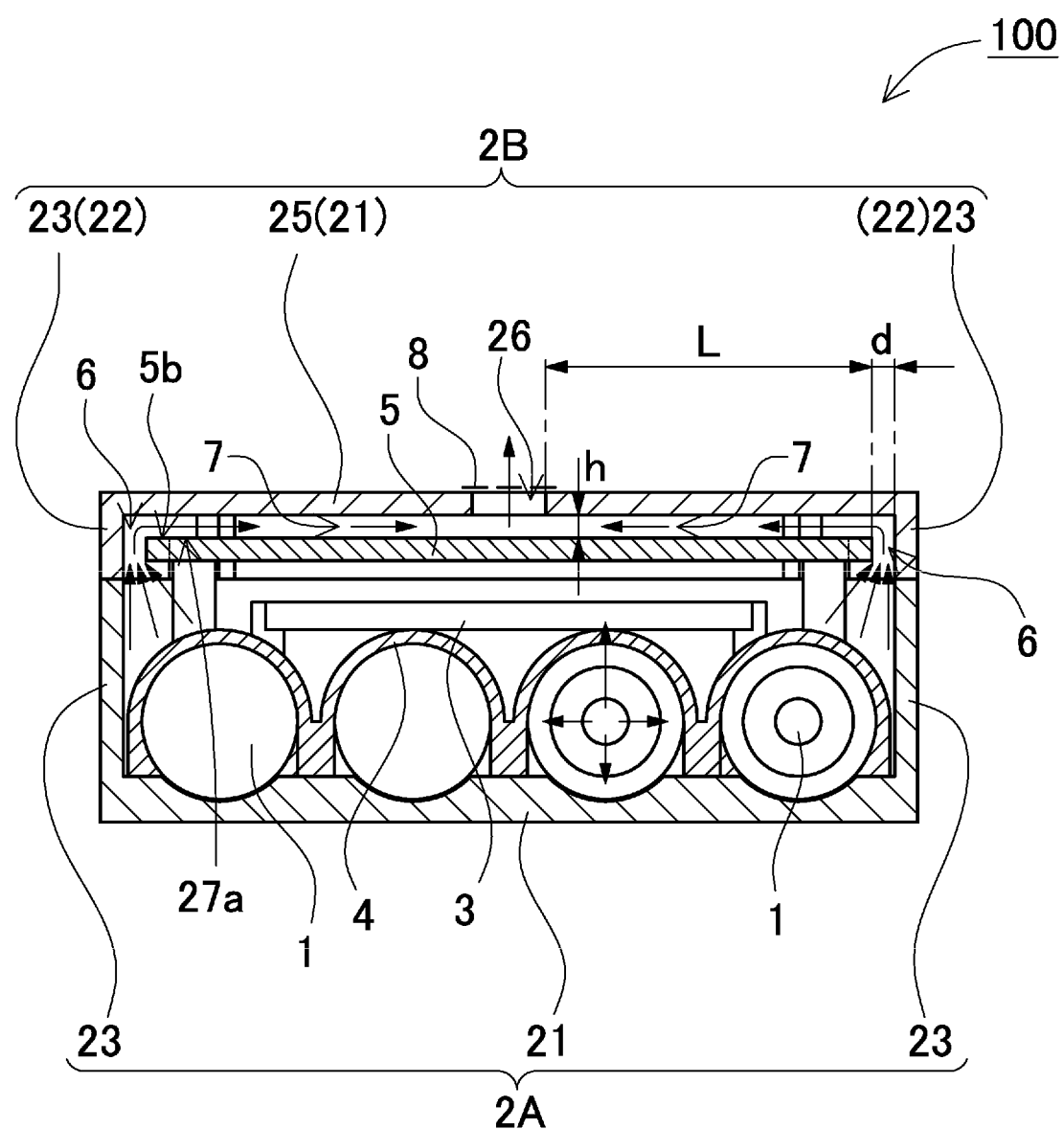
FIG. 2 is a schematic vertical cross-sectional view illustrating the internal structure of the power source device according to the exemplary embodiment of the present invention.
Figure 4:
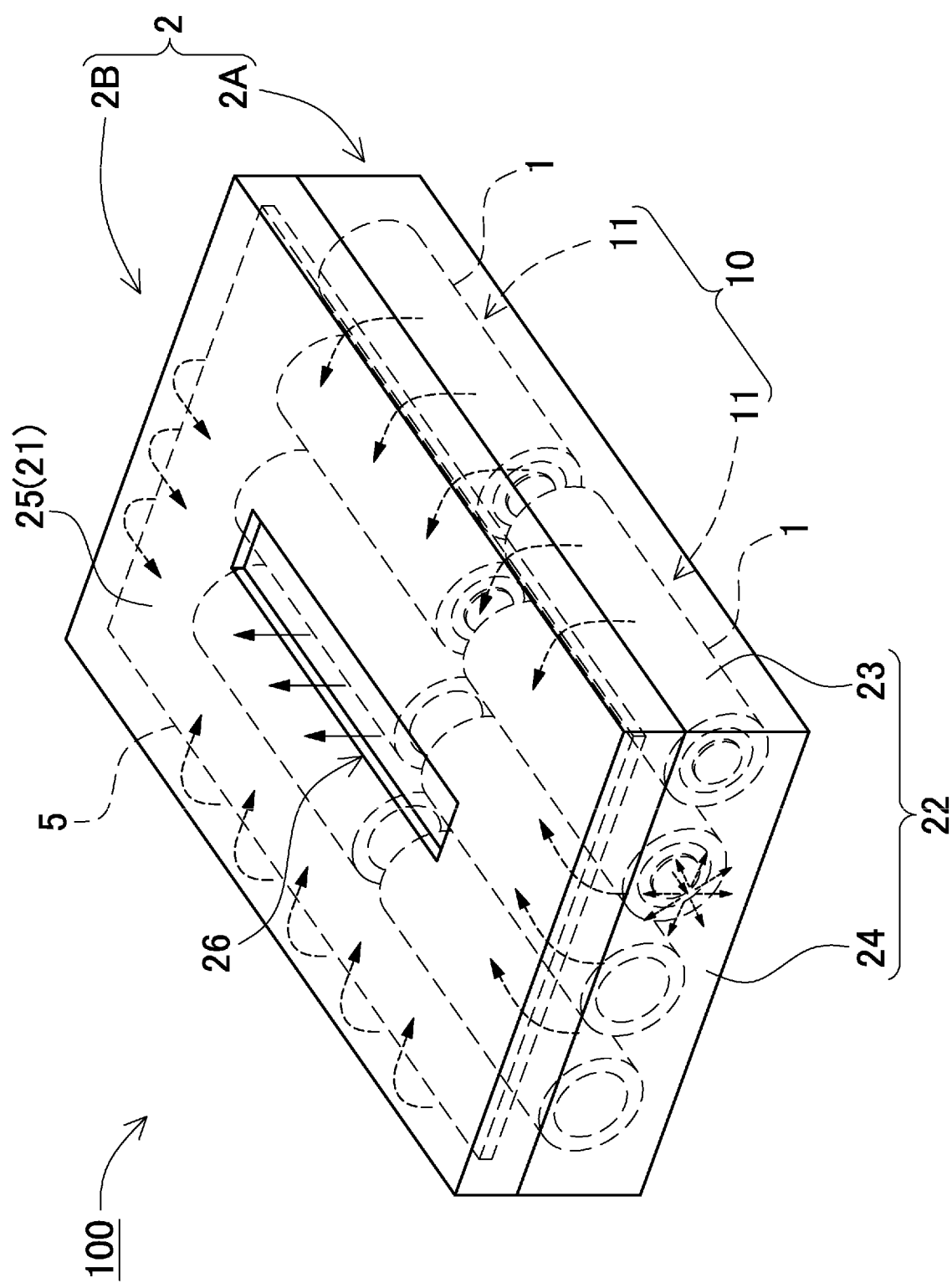
FIG. 4 is a schematic perspective view illustrating the internal structure of the power source device according to the exemplary embodiment of the present invention.

Outer case 2 is made of a thermoplastic resin such as polycarbonate excellent in heat resistance, in which the entirety is molded into a quadrangular box shape, and in the inside of which batteries 1, heat-resistant plate 5 and circuit board 3 are arranged at fixed positions. Outer case 2 in the drawing has a box shape in which peripheries of a pair of surface plate portions 21 are surrounded by peripheral wall 22. Outer case 2 in FIG. 1, FIG. 2, and FIG. 4 is composed of; main body case 2A provided with peripheral wall 22 along the periphery of quadrangular surface plate portion 21; and cover case 2B provided with low peripheral wall 22 around an outer periphery of surface plate portion 21 that closes an opening portion of main body case 2A. The pair of surface plate portions 21 are quadrangular, and rectangular in the drawings. Peripheral wall 22 is composed of; both-side sidewalls 23 which extend in a longitudinal direction of rectangular surface plate portion 21; and end walls 24 perpendicular to these sidewalls 23. Outer case 2 in the drawings has batteries 1 arranged therein in a posture where end walls 24 of peripheral wall 22 and the sealing plates of the cylindrical batteries face each other.

The plurality of batteries 1 are arranged at the fixed positions by battery holder 4, and form battery block 10. Battery block 10 in FIGS. 1 and 2 arranges the plurality of batteries 1 on the same plane and arrays the same in a parallel posture. This battery block 10 is composed of two battery units 11. Battery unit 11 arranges four lines of batteries 1 on the same plane in a parallel posture, and arranges both end surfaces of batteries 1 on the same plane. Two battery units 11 have the cylindrical batteries coupled to one another so as to be arrayed linearly, and form battery block 10. Battery units 11 arrange batteries 1 in fitting portions provided in battery holder 4 made of plastics, and array the same at the fixed positions.

Battery block 10 in the drawings arrays, in four lines, batteries commonly known as and called "18650", that is, cylindrical batteries with an outer diameter of 18 mm and a length of 650 mm, thereby forming battery units 11, and arranges two battery units 11 in series to each other. This battery block 10 lengthens an overall length thereof to more than twice a length of two cylindrical batteries, and widens a width thereof to more than four times the outer diameter of the cylindrical batteries. Accordingly, the overall length becomes approximately 15 cm which is more than twice 6.5 cm, the width becomes approximately 10 cm which is more than four times 1.8 cm, and a thickness of battery block 10 becomes more than approximately 20 mm which is thicker than the diameter.

Rectangular outer case 2 houses therein battery block 10 with such an outer shape as described above. Accordingly, surface plate portions 21 on both surfaces have an outer shape larger than 15 cm×10 cm, and a thickness thicker than 2 cm. Battery block 10 constitutes six surfaces of such a rectangular parallelepiped by the pair of surface plate portions 21 and four peripheral walls 22, in which surface plate portions 21 have a maximum surface area. Outer case 2 is provided with discharge opening 26 in a central region of surface plate portion 21 with the maximum area. Outer case 2 defines, as exhaust surface 25, the surface provided with discharge opening 26, and arranges the cylindrical batteries in a plane parallel to exhaust surface 25.

(Heat-Resistant Plate 5)

Heat-resistant plate 5 is disposed to face exhaust surface 25 in an inside of exhaust surface 25. Heat-resistant plate 5 can use a thermoplastic resin excellent in a temperature resistant property, for example, polycarbonate and polyamide which are excellent in heat resistance and strength. Heat-resistant plate 5 obtained by molding the thermoplastic resin into a plate shape can be subjected to low-cost mass production. However, for heat-resistant plate 5, a thermosetting resin such as epoxy resin can also be used. Heat-resistant plate 5 made of plastics is excellent in insulation, and accordingly, can be disposed in outer case 2 without performing insulation treatment for the surface thereof. However, for heat-resistant plate 5, there can also be used a metal plate or one obtained by laminating plastics on a surface of the metal plate or applying an insulating coating film thereto to mold the same into a plate shape.

(Energy Attenuation Gap 6)

Heat-resistant plate 5 has an outer shape smaller than an inner shape of peripheral wall 22 provided along the periphery of surface plate portion 21, and is disposed inside peripheral wall 22. Energy attenuation gap 6 is provided between an outer peripheral edge of heat-resistant plate 5 and peripheral wall 22. Energy attenuation gap 6 allows passage of the emission gas in a state where the emission gas has resistance, that is, has a pressure loss, and attenuates energy of the emission gas that passes therethrough. Arrows in FIGS. 1 to 4 indicate a route where the discharge valve provided in the sealing plate of battery 1 opens and the emission gas and the like which are discharged from battery 1 are discharged from discharge opening 26. Energy attenuation gap 6 illustrated in the drawings is formed into a slit shape composed by being provided between an inner surface of outer case 2 and the outer peripheral edge of heat-resistant plate 5. When energy attenuation gap 6 is too wide, the pressure loss of the emission gas is reduced, and an energy attenuation effect is reduced. Accordingly, a slit-shaped gas (d) is set to, for example, less than or equal to 3 mm, preferably less than or equal to 2 mm, whereby the energy of the emission gas is attenuated efficiently. However, when energy attenuation gap 6 is too narrow, a flow of the emission gas that passes therethrough is reduced, a time while the high-temperature emission gas stays inside heat-resistant plate 5 is lengthened, and there occurs a harmful effect that plastics and the like are molten. Accordingly, the slit-shaped gap (d) is set to, for example, 0.2 mm or more, preferably 0.3 mm or more.

Energy attenuation gap 6 is set to an optimal value in consideration of an overall length thereof by which energy attenuation gap 6 is provided along the outer peripheral edge of heat-resistant plate 5. Energy attenuation gap 6 is provided on an entire periphery of the outer peripheral edge of heat-resistant plate 5, and can thereby lengthen the overall length. Hence, in a structure in which energy attenuation gap 6 is provided on the entire outer peripheral edge of heat-resistant plate 5, the gap (d) of energy attenuation gap 6 is set narrow in the above-mentioned range, and in a structure in which energy attenuation gap 6 is provided on a part of heat-resistant plate 5, the gap (d) of energy attenuation gap 6 is set wide in the above-mentioned range. Moreover, the gap (d) of energy attenuation gap 6 is set to the optimal value also in consideration of a capacity of battery 1. When the capacity of battery 1 increases, an amount of the emission gas to be jetted at one time increases. Accordingly, in a power source device that builds therein battery 1 with a large capacity, the gap (d) of energy attenuation gap 6 is widened, whereby the time while the high-temperature emission gas stays inside heat-resistant plate 5 is prevented from being extended.

(Coupling Slit 5a)

Figure 3:
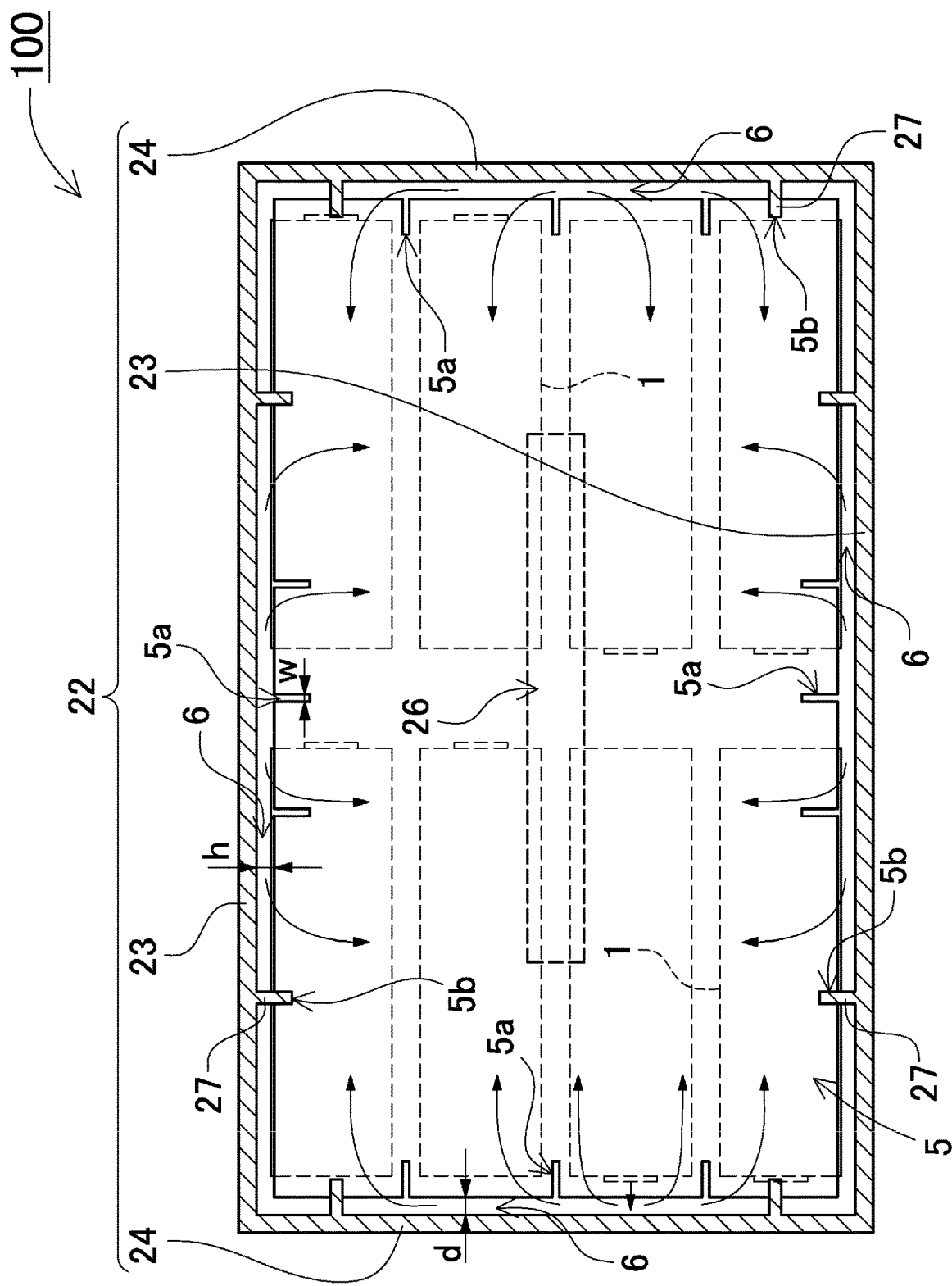
FIG. 3 is a plan view illustrating the internal structure of the power source device according to the exemplary embodiment of the present invention.

Heat-resistant plate 5 illustrated in the schematic plan view of FIG. 3 is provided with plural lines of coupling slits 5a which intersect energy attenuation gap 6 and are coupled to energy attenuation gap 6. A width (w) of coupling slits 5a is set to be substantially the same as the gap (d) of energy attenuation gap 6. The emission gas is caused to pass through coupling slits 5a to attenuate the energy. The emission gas that passes through coupling slits 5a radiates heat to heat-resistant plate 5 and heats heat-resistant plate 5. Accordingly, coupling slits 5a are not arranged close to one another, but for example, coupling slits 5a with a width of 1 mm are arranged at intervals of 1 cm. In heat-resistant plate 5 in FIG. 3, coupling slits 5a are not provided on the entire periphery of heat-resistant plate 5, but are provided on a part thereof to prevent a heat loss of heat-resistant plate 5.

(Heat Radiation Gap 7)

Moreover, heat-resistant plate 5 is provided with planar heat radiation gap 7 between the same and an inner surface of exhaust surface 25. Heat-resistant plate 5 is disposed in an attitude parallel to exhaust surface 25, and is provided with heat radiation gap 7 at a fixed interval (h). As indicated by the arrows of FIGS. 1 to 4, heat radiation gap 7 flows the emission gas, which flows in from energy attenuation gap 6, along exhaust surface 25 and the surface of heat-resistant plate 5, and for cooling, radiates thermal energy of the emission gas to exhaust surface 25 and heat-resistant plate 5. The thermal energy of the emission gas is radiated efficiently by exhaust surface 25. This is because, since exhaust surface 25 is in a state where an outside surface thereof is cooled by air at timing when the emission gas is jetted from the discharge valve, exhaust surface 25 is in a cooled state until immediately before the emission gas is flown in from energy attenuation gap 6.

The emission gas flown into heat radiation gap 7 from energy attenuation gap 6 flows on the surface of exhaust surface 25 and the surface of heat-resistant plate 5, and efficiently radiates the thermal energy to exhaust surface 25 and heat-resistant plate 5. This is because an amount of heat to be thermally conducted between gas and solid as a result of contact of both increases by the fact that the gas flows relatively to the solid, and because the amount of heat to be thus thermally conducted increases rapidly by the fact that the gas flows at high speed on the surface of the sold. Exhaust surface 25 that receives the radiated thermal energy of the emission gas is in a state of bringing the outside surface thereof into contact with air and being capable of heat radiation to the outside. Accordingly, exhaust surface 25 rapidly radiates, to the outside, the thermal energy radiated from the emission gas, in other words, thermal energy absorbed from the emission gas. Therefore, exhaust surface 25 efficiently absorbs the thermal energy from the emission gas that flows thereon, and decreases the temperature.

Heat radiation gap 7 flows the emission gas at high speed, and absorbs the thermal energy of the emission gas to exhaust surface 25 and heat-resistant plate 5, and further, also attenuates kinetic energy by the pressure loss of the emission gas that passes through such a narrow gap. When heat radiation gap 7 is too wide, the energy attenuation effect is reduced. Accordingly, the interval (h) of heat radiation gap 7 is set to, for example, less than or equal to 3 mm, preferably less than or equal to 2 mm, whereby the energy of the emission gas is attenuated efficiently. However, when heat radiation gap 7 is too narrow, a flow of the emission gas that passes therethrough is restricted to disable the rapid exhaust, a time while the high-temperature emission gas stays inside outer case 2 is lengthened, and there occurs such a harmful effect that plastics of battery holder 4, heat-resistant plate 5 and the like are molten. Accordingly, the interval (h) of heat radiation gap 7 is set to, for example, 0.2 mm or more, preferably 0.3 mm or more.

Heat-resistant plate 5 is disposed at a specific position of outer case 2, is provided with energy attenuation gap 6, which is predetermined, on the outer peripheral edge, and is provided with predetermined heat radiation gap 7 between the same and exhaust surface 25. In order to dispose heat-resistant plate 5 at such a specific position of outer case 2, heat-resistant plate 5 illustrated in FIGS. 1 to 3 is provided with positioning recesses 5b on the outer peripheral edge. Support ribs 27 which guide positioning recesses 5b are provided by being protruded to the inner surface of outer case 2 and being molded integrally with outer case 2. Support ribs 27 in FIGS. 1 and 2 are provided with step parts 27a which couple thereto heat-resistant plate 5 and arrange the same at fixed positions, and cause heat-resistant plate 5 to abut against step parts 27a and arrange heat-resistant plate 5 at a fixed position. Heat-resistant plate 5 disposed on step parts 27a is pressed by circuit board 3 and battery holder 4 which are arranged on the surface thereof, and is disposed at the fixed position. In particular, outer case 2 illustrated in FIGS. 1 and 2 is provided with support ribs 27 on an inner surface of cover case 2B including exhaust surface 25, and enables step parts 27a of support ribs 27 to form an interval between exhaust surface 25 and heat-resistant plate 5 to the predetermined interval (h). That is, step parts 27a of support ribs 27 are molded such that a height thereof can be equalized to the interval (h) of heat radiation gap 7, and heat-resistant plate 5 is disposed in a state of being caused to abut against step parts 27a, whereby it is made possible to form the interval (h) of the heat radiation gap, which is formed between exhaust surface 25 and heat-resistant plate 5, into a predetermined interval easily and accurately. Moreover, positioning recesses 5b are coupled to support ribs 27 provided on four sides to face each other and are arranged at the fixed positions in the inside of outer case 2, whereby heat-resistant plate 5 in FIG. 3 is formed such that energy attenuation gap 6 formed along the outer peripheral edge of heat-resistant plate 5 and between the same and peripheral walls 24 as inner surfaces of outer case 2 becomes the predetermined gap (d).

(Discharge Opening 26)

The emission gas that has flown through heat radiation gap 7 is discharged to the outside form discharge opening 26 of exhaust surface 25. Power source device 100 in FIG. 4 is provided with discharge opening 26 on a central region of exhaust surface 25. Discharge opening 26 on the central region is opened into a shape elongated in a longitudinal direction of rectangular heat-resistant plate 5, flows the emission gas, which flows into heat radiation gap 7 from energy attenuation gap 6 provided on the entire periphery of heat-resistant plate 5, into a long route of heat radiation gap 7, and disposes the emission gas to the outside. Discharge opening 26 is opened at a position farthest from energy attenuation gap 6, lengthens a distance at which the emission gas flows through heat radiation gap 7, efficiently attenuates the energy, and discharges the emission gas to the outside. As described above, as illustrated in FIGS. 1 and 2, such a structure in which discharge opening 26 is disposed on the center portion of exhaust surface 25 equalizes an interval (L) between discharge opening 26 and energy attenuation gap 6 provided on the entire periphery of heat-resistant plate 5, and by the thermal energy of the emission gas that has flown into heat radiation gap 7, can efficiently radiate heat to exhaust surface 25 and perform the discharge.

Second Exemplary Embodiment

Figure 5:
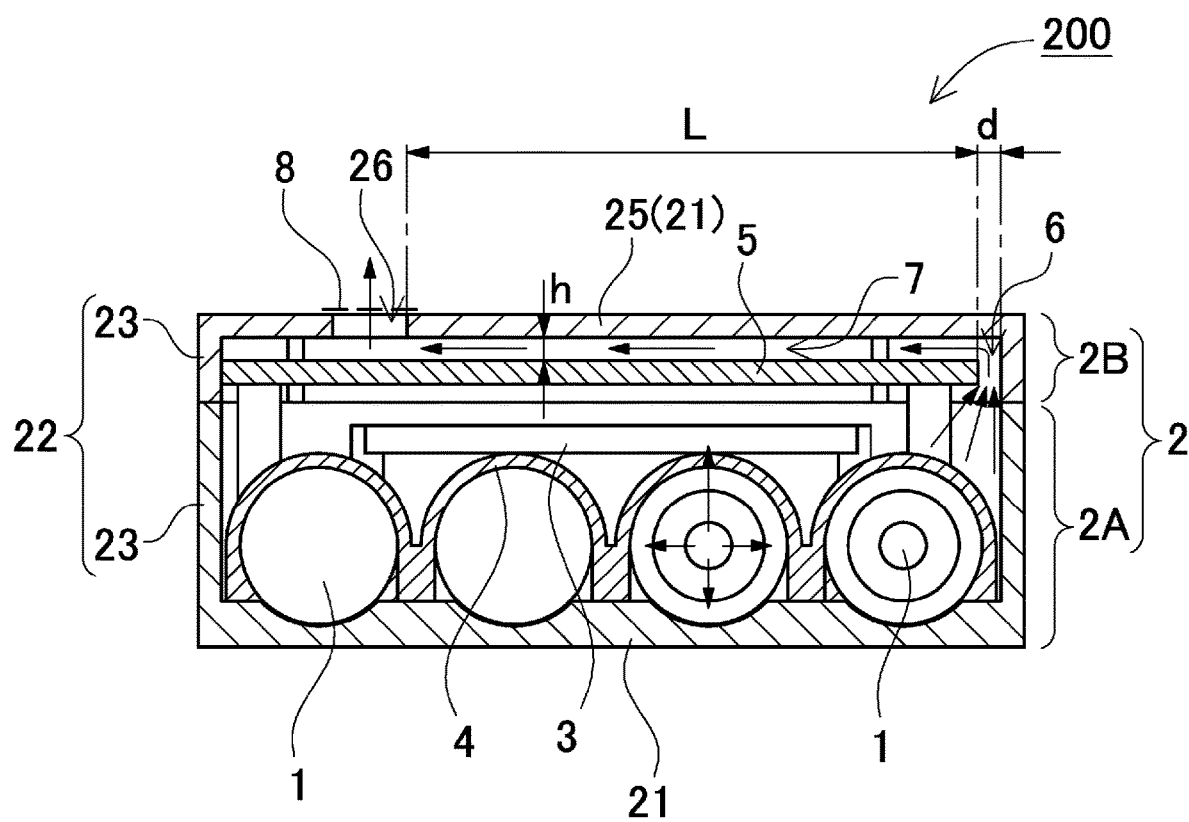
FIG. 5 is a schematic vertical cross-sectional view illustrating an internal structure of a power source device according to another exemplary embodiment of the present invention.

Further, as illustrated in FIG. 5, power source device 200 in which one side of heat-resistant plate 5 is provided with energy attenuation gap 6 disposes a position of discharge opening 26, which opens on exhaust surface 25, opposite to energy attenuation gap 6, and lengthens a flow path of the emission gas that flows through heat radiation gap 7. This structure can lengthen the interval (L) from energy attenuation gap 6 to discharge opening 26. Accordingly, the structure can flow the emission gas, which has flown into heat radiation gap 7 from energy attenuation gap 6, for a long time along exhaust surface 25, and can discharge the emission gas from discharge opening 26. Then, this structure can efficiently radiate, to exhaust surface 25, the emission gas that flows through heat radiation gap 7, and can discharge the emission gas. Arrows in FIG. 5 indicate a route where the discharge valve provided in the sealing plate of battery 1 opens and the emission gas discharged from battery 1 is discharged from discharge opening 26.

(Label 8)

Further, outer case 2 illustrated in FIGS. 1 and 2 causes label 8 to close discharge opening 26 opened in exhaust surface 25. This label 8 uses a sheet material to be peeled off or molten by the discharged gas discharged from the discharge valve. This power source device 100 causes label 8 to close discharge opening 26 opened to exhaust surface 25 of the outer case, and can thereby prevent a foreign object from passing through discharge opening 26 of outer case 2 and entering the inside thereof. When the discharged gas is discharged from the discharge valve of battery 1, this label 8 is removed by being peeled off by a pressure of the discharged gas that passes through energy attenuation gap 6 and passes through heat radiation gap 7, or by being molten by heat of the high-temperature discharged gas.

(Circuit Board 3)

Circuit board 3 is coupled to battery holder 4 by a fitting structure, and is disposed at a fixed position. Circuit board 3 mounts thereon electronic components (not shown) which are connected to battery 1 and achieve a protection circuit of battery 1. The protection circuit is a circuit that prevents overcharge and overdischarge of battery 1, or a circuit that prevents overcurrent, or a circuit that cuts off an overcurrent, or a circuit that cuts off a current in a state where temperature rises abnormally.

INDUSTRIAL APPLICABILITY

The present invention can be effectively used for a power source device that safely discharges emission gas.

REFERENCE MARKS IN THE DRAWINGS 100, 200 power source device
1 battery
2 outer case
2A main body case
2B cover case
3 circuit board
4 battery holder
5 heat-resistant plate
5a coupling slit
5b positioning recess
6 energy attenuation gap
7 heat radiation gap
8 label
10 battery block
11 battery unit
21 surface plate portion
22 peripheral wall
23 sidewall
24 end wall
25 exhaust surface
26 discharge opening
27 support rib
27a step part

The invention claimed is:

1. A power source device comprising:
a plurality of batteries each including a discharge valve that opens when a pressure in the battery becomes higher than a set pressure and jets emission gas from the battery;
an outer case that houses the plurality of batteries the outer case including a discharge opening that discharges, to an outside, the emission gas from the discharge valve; and
a heat-resistant plate that is disposed inside the outer case and faces an exhaust surface including the discharge opening, the exhaust surface being a part of the outer case,
wherein the heat-resistant plate:
is disposed with, along an outer peripheral edge of the heat-resistant plate, an energy attenuation gap between the heat-resistant plate and an inner surface of the outer case;
is disposed with a planar heat radiation gap between the heat-resistant plate and an inner surface of the exhaust surface; and
causes the emission gas jetted from the discharge valve of each of the plurality of batteries to pass through the energy attenuation gap and the planar heat radiation gap, and to be discharged from the discharge opening to the outside,
wherein
the energy attenuation gap is provided on an entirety of the outer peripheral edge of the heat-resistant plate, and
the discharge opening is a sole opening provided in a central region of the exhaust surface, such that at least in one direction along the exhaust surface, a pair of opposite ends of the discharge opening is equidistant from the energy attenuation gap.

2. The power source device according to claim 1, wherein the energy attenuation gap is a slit between the inner surface of the outer case and the outer peripheral edge of the heat-resistant plate.

3. The power source device according to claim 2, wherein the energy attenuation gap is less than or equal to 3 mm.

4. The power source device according to claim 1, wherein the heat-resistant plate includes a plurality of coupling slits each continuous with the energy attenuation gap, and in plan view of the heat-resistant plate, each coupling slit comprises a recess extending inward from an outermost part of the heat-resistant plate that is closest to the inner surface of the outer case.

5. The power source device according to claim 1, wherein an interval between the heat-resistant plate and the exhaust surface is set to less than or equal to 3 mm, and the power source device includes the planar heat radiation gap.

6. The power source device according to claim 1, wherein the heat-resistant plate is a laminated body of heat-resistant plate plastics or a metal plate, or of plastics and a metal plate.

7. The power source device according to claim 1, wherein the outer case has a square shape, and
the exhaust surface is a surface plate portion with a maximum area.

8. The power source device according to claim 7, wherein the plurality of batteries are the cylindrical batteries, and
the plurality of the cylindrical batteries are located in a plane parallel to the surface plate portion, and are arranged in parallel to one another.

9. The power source device according to claim 1, further comprises
one or more support ribs which protrude to the inner surface of the outer case and support the heat-resistant plate, the one or more support ribs being integrally molded, and
the heat-resistant plate is mounted on the one or more support ribs and providing the energy attenuation gap along the outer peripheral edge.

10. The power source device according to claim 9, wherein the one or more support ribs include step parts which mount the heat-resistant plate and dispose the heat-resistant plate at a fixed position.

11. A power source device comprising:
a plurality of batteries each including a discharge valve that opens when a pressure in the battery becomes higher than a set pressure and jets emission gas from the battery;
an outer case that houses the plurality of batteries the outer case including a discharge opening that discharges, to an outside, the emission gas from the discharge valve; and
a heat-resistant plate that is disposed inside the outer case and faces an exhaust surface including the discharge opening, the exhaust surface being a part of the outer case,
wherein the heat-resistant plate:
is disposed with, along an outer peripheral edge of the heat-resistant plate, an energy attenuation gap between the heat-resistant plate and an inner surface of the outer case;
is disposed with a planar heat radiation gap between the heat-resistant plate and an inner surface of the exhaust surface; and
causes the emission gas jetted from the discharge valve of each of the plurality of batteries to pass through the energy attenuation gap and the planar heat radiation gap, and to be discharged from the discharge opening to the outside,
wherein
the heat-resistant plate has a first end and a second end opposite each other in a direction along the exhaust surface, the first end of the heat-resistant plate is spaced apart from the inner surface of the outer case so as to define the energy attenuation gap therebetween, the second end of the heat-resistant plate is directly adjacent to the inner surface of the outer case, and the discharge opening is a sole opening provided closer to the second end than the first end of the heat-resistant plate in the direction along the exhaust surface.

12. A power source device comprising:

a plurality of batteries each including a discharge valve that opens when a pressure in the battery becomes higher than a set pressure and jets emission gas from the battery;

an outer case that houses the plurality of batteries the outer case including a discharge opening that discharges, to an outside, the emission gas from the discharge valve; and a heat-resistant plate that is disposed inside the outer case and faces an exhaust surface including the discharge opening, the exhaust surface being a part of the outer case, wherein the heat-resistant plate:

is disposed with, along an outer peripheral edge of the heat-resistant plate, an energy attenuation gap between the heat-resistant plate and an inner surface of the outer case;

is disposed with a planar heat radiation gap between the heat-resistant plate and an inner surface of the exhaust surface; and causes the emission gas jetted from the discharge valve of each of the plurality of batteries to pass through the energy attenuation gap and the planar heat radiation gap, and to be discharged from the discharge opening to the outside, wherein the heat-resistant plate includes a plurality of coupling slits each continuous with the energy attenuation gap, and in plan view of the heat-resistant plate, each coupling slit comprises a recess extending inward from an outermost part of the heat-resistant plate that is closest to the inner surface of the outer case.

\* \* \* \* \*